(12) United States Patent
Williams

(10) Patent No.: US 8,374,823 B1
(45) Date of Patent: Feb. 12, 2013

(54) METHOD AND APPARATUS FOR MONITORING VARIATIONS IN A PARAMETER OVER TIME

(75) Inventor: Emrys J. Williams, Milton Keynes (GB)

(73) Assignee: Oracle America, Inc., Redwood City, CA (US)

( * ) Notice: Subject to any disclaimer, the term of this patent is extended or adjusted under 35 U.S.C. 154(b) by 2181 days.

(21) Appl. No.: 10/782,490

(22) Filed: Feb. 19, 2004

(51) Int. Cl.
*G06F 15/00* (2006.01)

(52) U.S. Cl. ........... 702/187; 702/183; 714/25; 714/728

(58) Field of Classification Search .................. 702/187, 702/185, 34, 81, 194, 183; 714/25, 726, 714/728; 324/115
See application file for complete search history.

(56) References Cited

U.S. PATENT DOCUMENTS

| | | | | |
|---|---|---|---|---|
| 4,114,094 A | * | 9/1978 | Cook et al. | 324/115 |
| 4,295,128 A | | 10/1981 | Hashemian et al. | |
| 4,568,934 A | * | 2/1986 | Allgood | 340/870.02 |
| 4,707,796 A | * | 11/1987 | Calabro et al. | 702/34 |
| 5,737,581 A | * | 4/1998 | Keane | 703/6 |
| 5,991,707 A | * | 11/1999 | Searles et al. | 702/185 |
| 6,163,715 A | * | 12/2000 | Larsen et al. | 600/323 |
| 6,308,138 B1 | * | 10/2001 | Jones et al. | 702/34 |
| 6,411,908 B1 | * | 6/2002 | Talbott | 702/34 |
| 6,442,511 B1 | * | 8/2002 | Sarangapani et al. | 702/194 |
| 6,453,279 B1 | | 9/2002 | Prasad et al. | |
| 6,532,426 B1 | * | 3/2003 | Hooks et al. | 702/81 |
| 6,879,926 B2 | | 4/2005 | Schmit et al. | |
| 6,889,173 B2 | | 5/2005 | Singh | |
| 2003/0145646 A1 | | 8/2003 | Henry et al. | |

OTHER PUBLICATIONS

"Industry Standard Reset Chips," http://www.ferret.com/au/articles/39/0c)1d339.asp, Jan. 28, 2004, (1 page).

* cited by examiner

*Primary Examiner* — Jonathan C Teixeira Moffat
*Assistant Examiner* — Hien X Vo
(74) *Attorney, Agent, or Firm* — Robert C. Kowert; Meyertons, Hood, Kivlin, Kowert & Goetzel, P.C.

(57) ABSTRACT

A method and apparatus are provided for monitoring a parameter such as temperature in a system such as a computer server. The method involves defining a monitoring range for the parameter. Typically, the parameter initially lies within the monitoring range. The parameter is then tracked by determining whenever the parameter exceeds an upper or lower limit of the monitoring range. If such a limit is reached, the monitoring range is adjusted to try to accommodate the parameter within the adjusted monitoring range. A time history of the monitoring range may be recorded, including details of all the adjustments of the monitoring range. This allows the behavior of the parameter to be subsequently investigated for diagnostic purposes.

45 Claims, 9 Drawing Sheets

METHOD AND APPARATUS FOR MONITORING VARIATIONS IN A PARAMETER OVER TIME

FIELD OF THE INVENTION

The present invention relates to tracking the variations over time of a parameter such as temperature or voltage. The approach is especially relevant to diagnostic analysis for complex systems such as computer servers.

BACKGROUND OF THE INVENTION

In computers and other complex electrical systems it can be useful for diagnostic purposes to maintain a record of various parameters such as temperature or supply voltage. This data can subsequently be used for investigating faults, sometimes on a statistical basis. For example, it might be seen that components that may be subjected to a lower temperature or operated at a somewhat higher voltage are more prone to certain types of fault. Such analysis can then be used to improve reliability by redesigning the components concerned and/or by modifying the recommended operating parameters.

A typical mechanism for collecting such information is to locate monitors at various positions within the system in order to measure the parameter(s) of interest. A central management system, such as a service processor, is then used to poll the monitors in order to collect and store the monitor readings. This polling is typically performed on a regular basis, say every few minutes, or perhaps every time a certain type of operation is invoked.

However, polling in this manner is liable to miss short-term excursions in a parameter being monitored. This is unfortunate, in that such excursions may be of particular interest from a diagnostic perspective. In addition, repeatedly polling a parameter that is (in fact) relatively constant may be regarded as an undesirable overhead on the general operation of the system.

SUMMARY OF THE INVENTION

Accordingly, one embodiment of the invention provides a method of monitoring a parameter such as temperature or voltage. The method involves defining a monitoring range for the parameter. The parameter is then tracked by determining whenever the parameter exceeds a limit of the monitoring range. If such a determination is made, the method responds by adjusting the monitoring range to try to accommodate the parameter. Typically, a time history of the monitoring range is recorded. This time history generally includes information regarding all adjustments made to the monitoring range, and so allows the behaviour of the parameter being monitored to be subsequently reconstructed and investigated for diagnostic purposes. An indication of the monitoring range might also be displayed to a human operator on a control panel, to provide a visual indication of the behaviour of the parameter.

Such an approach has the advantage over known polling techniques in that it provides a constrained record of the parameter being measured. In other words, the parameter is known to lie within the (adjusted) monitoring range provided that the limits of the range are not exceeded, thereby allowing maximum and minimum possible values to be determined. It will be appreciated that it is often extreme values (i.e. maxima and/or minima) that are of most significance for diagnostic purposes. In addition, the approach does not impose any overhead on the system while the parameter remains relatively constant. Rather activity is only triggered when the parameter lies outside the monitoring range—i.e. when there is an event of interest to record.

Typically the monitoring range is defined by an upper threshold and a lower threshold. In one embodiment, the upper threshold is stored in a first register, and the lower threshold is stored in a second register. It can therefore be determined whether the parameter exceeds a limit of the monitoring range by comparing the parameter against the upper threshold in the first register and also against the lower threshold in the second register. The parameter then exceeds the limits of the range if it is greater than the upper threshold or smaller than the lower threshold.

In one particular embodiment, a digital to analogue conversion of the upper threshold and of the lower threshold is performed prior to this comparison. This then allows the current value of the parameter to be compared against the upper and lower thresholds using first and second analogue comparators respectively. The use of analogue comparators for this task allows a very rapid response to a parameter reaching the edge of the monitoring range.

It will be appreciated that many other implementations are possible. For example, one possibility is to use a hardware version based on digital electronics (i.e. digital comparators, etc.). Another possibility is to use a software version, where the comparisons and various other operations are performed in software (such as firmware, microcode, etc.).

In one embodiment, an interrupt is raised whenever it is determined that the parameter exceeds a limit of the monitoring range. This interrupt then triggers adjustment of the monitoring range. Typically, the interrupt is generated by a monitoring unit that is responsible for actually tracking the parameter being monitored. The interrupt is then transmitted from the monitoring unit to a control system, which is responsible for determining and setting the new monitoring range, as well as for recording a time history of monitoring range adjustments.

A wide variety of parameter tracking algorithms are possible. In some cases, the monitoring range may have a fixed width, and simply be moved up and down as appropriate to contain the parameter excursions. Alternatively, the monitoring range may have a variable width. This can be useful in situations where the parameter is subject to varying amounts of noise that are not, in themselves, of great interest. In such an embodiment, the monitoring range is generally expanded to cope with parameter variations. Subsequently, it may be attempted to contract the monitoring range, in order to allow the parameter value to be more tightly constrained. In one embodiment this is implemented by providing the system with one or more timers. After expiry of a timer, an attempt may be made to contract the monitoring range (typically subject to some predefined minimum monitoring range). In such circumstances, the time history of the width of the monitoring range can be used to estimate variations in the noise level being experienced by the parameter.

In some embodiments, adaptive tracking algorithms having various degrees of sophistication may be employed. These algorithms may adjust various aspects of the parameter tracking according to particular circumstances. Among the aspects that might be adjusted in this way are size of the monitoring range, size of movement of the monitoring range when a limit is exceeded, and time between any attempted contractions of the monitoring range. For example, if the parameter being measured repeatedly hits the top of the monitoring range, thereby causing successive updates, then the amount of upward adjustment per update might be increased. The skilled person will be aware of many other similar tracking strategies.

In some embodiments, the parameter tracking can be linked to an alarm system, for example to detect if the temperature or voltage has reached a dangerous level where some action must be taken (e.g. the system shut down). Thus an alarm might be triggered if a parameter reaches the limit of the monitoring range, where the limit corresponds to a predetermined alarm level. Note that such alarm levels can generally be set more accurately using the approach described herein than with known polling mechanisms, since an interrupt or some other such notification will be triggered immediately the monitoring range is breached.

In some embodiments, multiple overlapping monitoring ranges may be defined, for example a narrow range encompassed within a broader range. Such an arrangement accommodates the fact that a single monitoring range can be regarded as inactive once a parameter exceeds a range limit until the range can be adjusted appropriately. With two overlapping ranges however, even if a parameter breaches the narrow monitoring range, then normally it will still lie within the broader monitoring range. Consequently, the time history of the parameter is still contained within known bounds. In extreme circumstances, the parameter may move so quickly as to breach both the narrow and the broad monitoring ranges. In this situation, the relative timings of the successive breaches could be used to provide information about the parameter trajectory.

Another embodiment of the invention provides apparatus for tracking a parameter within a defined monitoring range. The apparatus comprises a monitor unit operable to determine whenever the parameter exceeds a limit of the defined monitoring range and a control system linked to the monitor unit. The control system is responsive to a determination by the monitor unit that the parameter exceeds the limit of the defined monitoring range to adjust the defined monitoring range to try to accommodate the parameter. Typically, the apparatus further comprises a storage facility operable to hold a time history of the defined monitoring range.

In one embodiment, the defined monitoring range is specified by an upper threshold and a lower threshold, and the monitor unit comprises a first register operable to store the upper threshold and a second register operable to store the lower threshold. The monitor unit further comprises a first analogue comparator and a second analogue comparator. In operation the first analogue comparator determines whether the parameter exceeds the upper threshold, and the second analogue comparator determines whether the parameter exceeds the lower threshold. The apparatus further comprises a first latch and a second latch. In operation, the first latch latches an output of the first analogue comparator and the second latch latches an output of the second analogue comparator. The apparatus further comprises an OR gate having as a first input an output of the first latch and having as a second input an output of the second latch. In this embodiment, the OR gate produces a positive output if either of the latches is positive, which in turn occurs if either of the comparators generates a positive signal, which in turn occurs if the parameter being tracked exceeds either the upper or lower limit of the defined monitoring range, as respectively specified by the first and second registers.

In a typical embodiment, the apparatus comprises a computer server or other such large-scale system. The apparatus contains multiple monitor units distributed around the system for measuring various parameters at appropriate locations. These are all linked to a single control system, which governs the monitoring range adjustments for each of these monitor units. The storage facility is then linked to the control system for recording the monitoring range time history for each of the multiple monitor units. Note that in an alternative approach, one or more of the monitoring units may store their time history locally, rather than in some centralised facility.

Another embodiment of the invention provides apparatus for monitoring a parameter in a system. The apparatus includes means for defining a monitoring range for the parameter; means for tracking the parameter by determining whenever the parameter exceeds a limit of the monitoring range; and means for responding to a determination that the parameter exceeds the limit of the monitoring range by adjusting the monitoring range accordingly.

Another embodiment of the invention provides a computer program product comprising program code in a medium. When executed by a machine, the program code causes the machine to define a monitoring range for the parameter. The parameter is then tracked by determining whenever the parameter exceeds a limit of the monitoring range, and if it is so determined, the monitoring range is adjusted to try to accommodate the (moved) parameter.

It will be appreciated that the apparatus and computer program product embodiments of the invention will generally benefit from the same particular features as the method embodiment of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
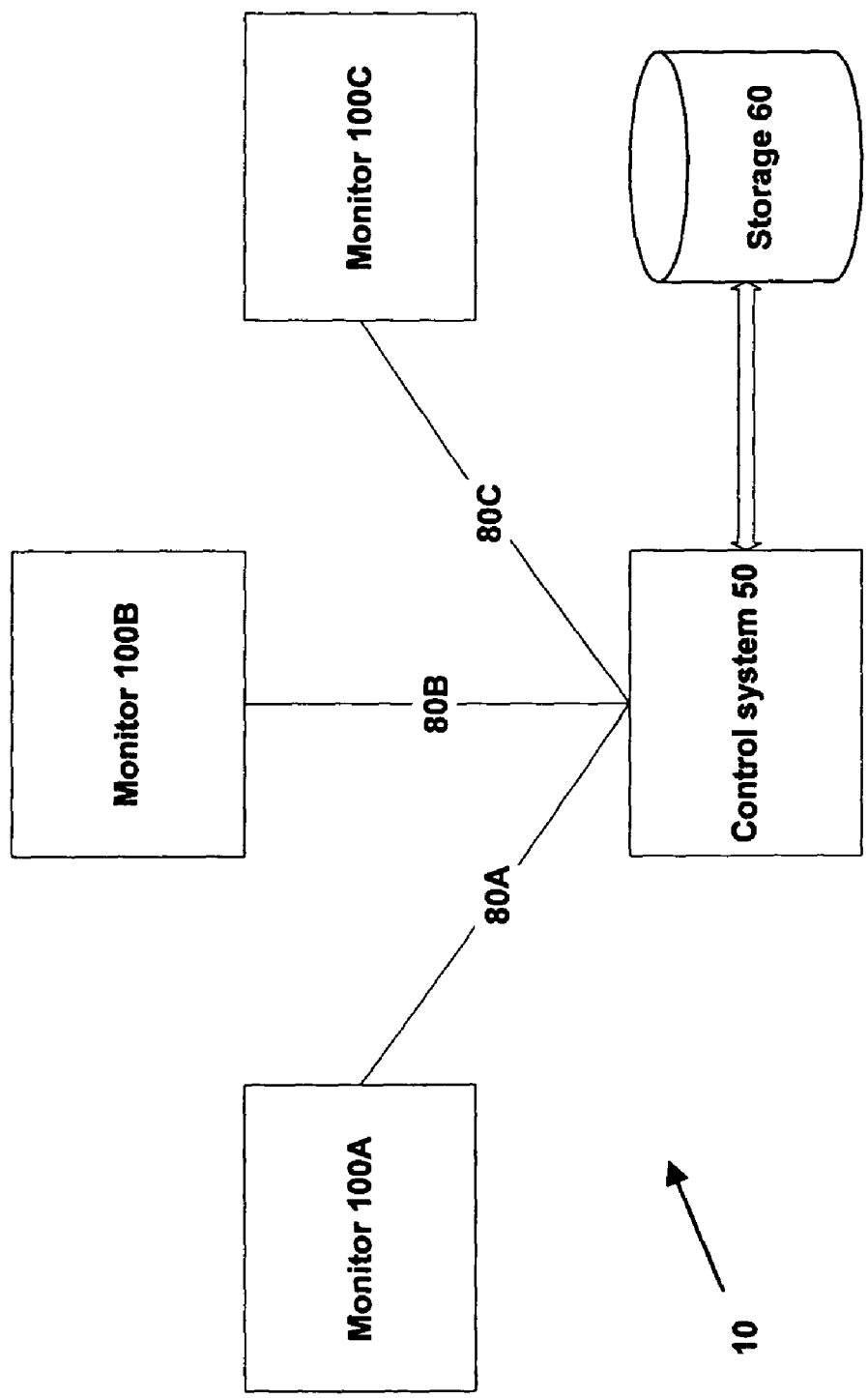
FIG. 1 illustrates a computer system including multiple monitoring units in accordance within one embodiment of the invention.

FIG. 1 is a high-level diagram illustrating a computer system 10 in accordance with one embodiment of the invention. The system 10 includes a control system 50 and multiple monitors 100A, 100B, and 100C that are distributed throughout the system. Note that although FIG. 1 shows only three monitors, a practical system may include a very large number of such monitors. The control system may be incorporated into a service processor of computer system 10. Monitors 100A, 100B, 100C may be located in the same device as the control system 50 or in one or more different devices, and can be utilised to record any desired parameter. In general the parameters being monitored represent various physical variables, such as temperature, vibration level, voltage, and so on, although potentially they might also reflect machine operating characteristics, such as an error rate as determined by an ECC unit.

The monitors 100A, 100B, 100C are linked to the control system by respective connections 80A, 80B, 80C. Each connection 80A, 80B, 80C supports the transfer of interrupts and associated diagnostic information from the relevant monitor 100A, 100B, 100C to control system 50, as well as the transfer of control commands and settings from control system 50 back to the monitor 100A, 100B, 100C (as will be described in more detail below). Although each of the connections 80A, 80B, 80C is depicted in FIG. 1 by a single link, they may in practice be implemented by one or more suitable communications mechanisms, such as a bus, cabling, a network interconnection, etc. One particularly convenient way of connecting monitors 100A, 100B 100C to control system 50 is to use some form of wireless link, such as a radio or microwave facility. (Note that different types of connection may be used for different monitors within the same system).

System 10 further includes a storage unit 60. This is used by control system 50 to record a log file or such-like of diagnostic information received from monitors 100A, 100B, 100C, together with information concerning various actions taken by the control system 50 itself. The data stored in unit 60 is then available for subsequent retrieval and analysis in order to understand better the operation of system 10.

Figure 2:
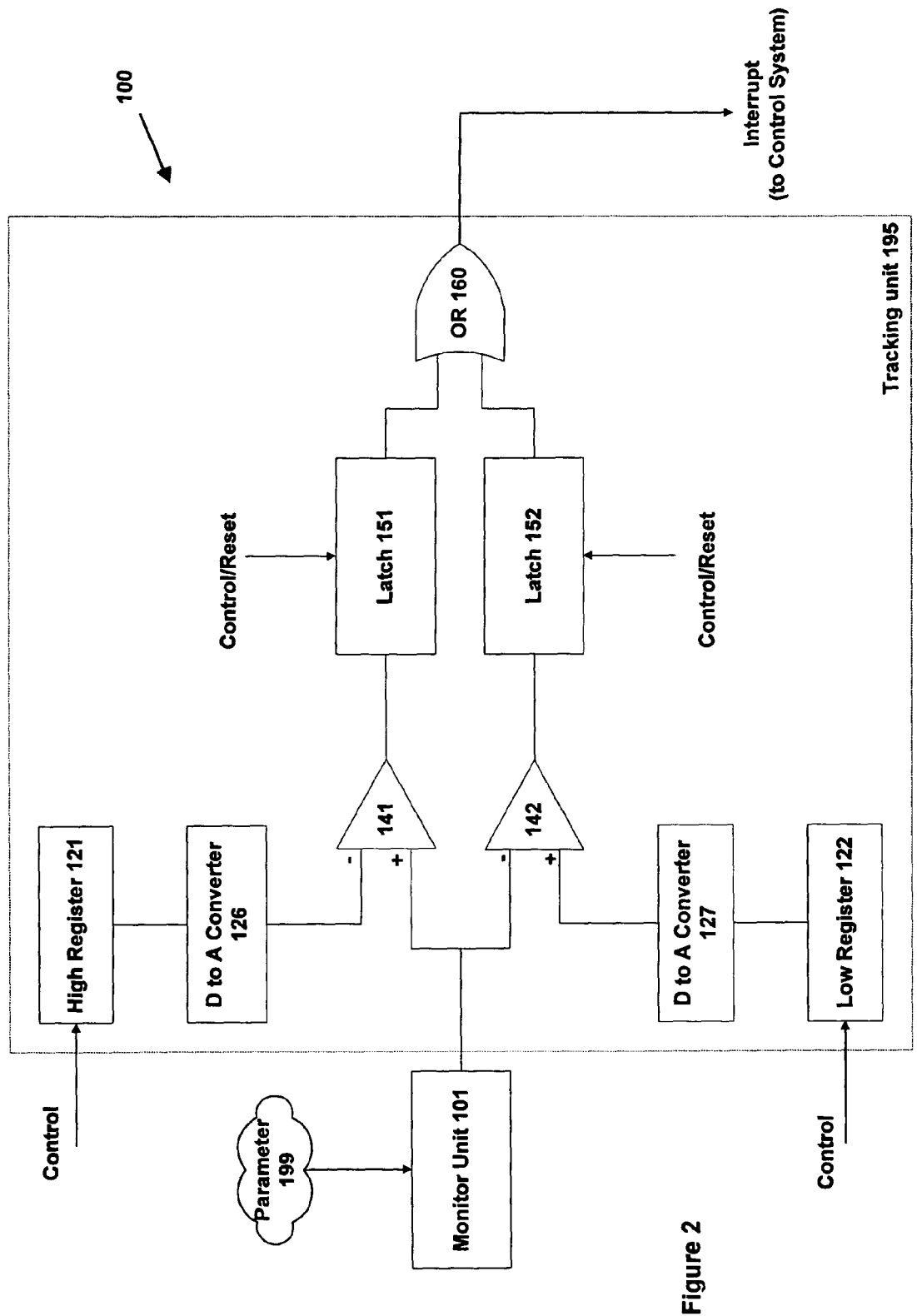
FIG. 2 illustrates in more detail a monitoring unit from the computer system of FIG. 1, in accordance with one embodiment of the invention.

FIG. 2 illustrates a monitor 100 in more detail in accordance with one embodiment of the invention. The two main components of monitor 100 are monitoring unit 101 and tracking unit 195. The monitoring unit 101 is responsible for real-time measurement of the parameter 199 of interest. In the embodiment shown in FIG. 2, monitor unit 101 provides an analogue output corresponding to the level of the parameter 199 being measured. This analogue output is fed to tracking unit 195, and in particular to two comparators 141, 142. Note that since comparators 141 and 142 are both analogue, they can operate with extremely high bandwidth if so desired. This allows them to respond rapidly to changes in output from monitor 101 (and hence in the parameter being measured).

Each comparator 141, 142 is connected to a respective digital to analogue (D/A) convertor 126, 127. Note that the plus input of comparator 141 is connected to the output from monitor unit 101, and the minus input of comparator 141 is connected to the output from D/A converter 126. Conversely, the minus input of comparator 142 is connected to the output from monitor unit 101, and the plus input of comparator 142 is connected to the output from D/A converter 127. It is assumed that each of comparators 141, 142 outputs a positive signal (such as 1) when its plus input is greater than its minus input, and a zero otherwise.

Monitoring system 100 further includes two adjustable registers, which will be referred to as a high register 121 and a low register 122. The contents of these two registers 121, 122 can be set by control system 50. The output from high register 121 is fed into D/A converter 126, while the output from low register 122 is fed into D/A converter 127. Accordingly, comparator 141 in effect compares the output from monitor 101 against the contents of high register 121, while comparator 142 compares the output from monitor 101 against the contents of low register 122. High register 121 and low register 122 can therefore be regarded as defining a range, which will be referred to as the monitoring range. Low register 122 is used to store the lower boundary or threshold of the range, and high register 121 is used to store the upper boundary or threshold of the range.

As long as parameter 199 stays within the above range, the output from monitor 101 will be below the value in high register 121 and above the value in low register 122. Consequently, both comparator 141 and comparator 142 will output a zero signal. However, parameter 199 may vary with time, and this variation may be sufficient to take the parameter (and hence the output from monitoring unit 101) to the edge of the monitoring range. In this case either comparator 141 or comparator 142 (as appropriate) will register a positive signal. In particular, if the output from monitoring unit 101 goes above the value in high register 121, then this will be detected by comparator 141, which will therefore produce a positive output. Alternatively, if the output from monitoring unit 101 falls below the value stored in low register 122, then comparator 142 will produce a positive output.

The output from comparator 141 is taken to a latch 151 and the output from comparator 142 is taken to a latch 152. The control system 50 initially sets both of these latches 151, 152 to zero. Latches 151 and 152 then remain at zero for as long as comparators 141 and 142 produce a zero output, in other words, for as long as the parameter being measured remains within the monitoring range.

However, if the parameter being measured reaches the edge of the monitoring range, then the appropriate comparator 141, 142 produces a positive output, which in turn sets the corresponding latch 151, 152 to one. More particularly, if the parameter being monitored goes to the top of the monitoring range, then comparator 141 triggers, and so latch 151 is set to one. Conversely, if the parameter being monitored goes to the bottom of the monitoring range, then comparator 142 triggers, and so latch 152 is set to one.

The outputs of both latch 151 and latch 152 are connected to OR gate 160. The output from OR gate 160 is then used to generate an interrupt that is passed back to the control system 50. It will be appreciated that this interrupt is generated whenever the signal from monitor 101 lies outside the boundaries of the monitoring range defined by low register 122 and high register 121.

Figure 3:
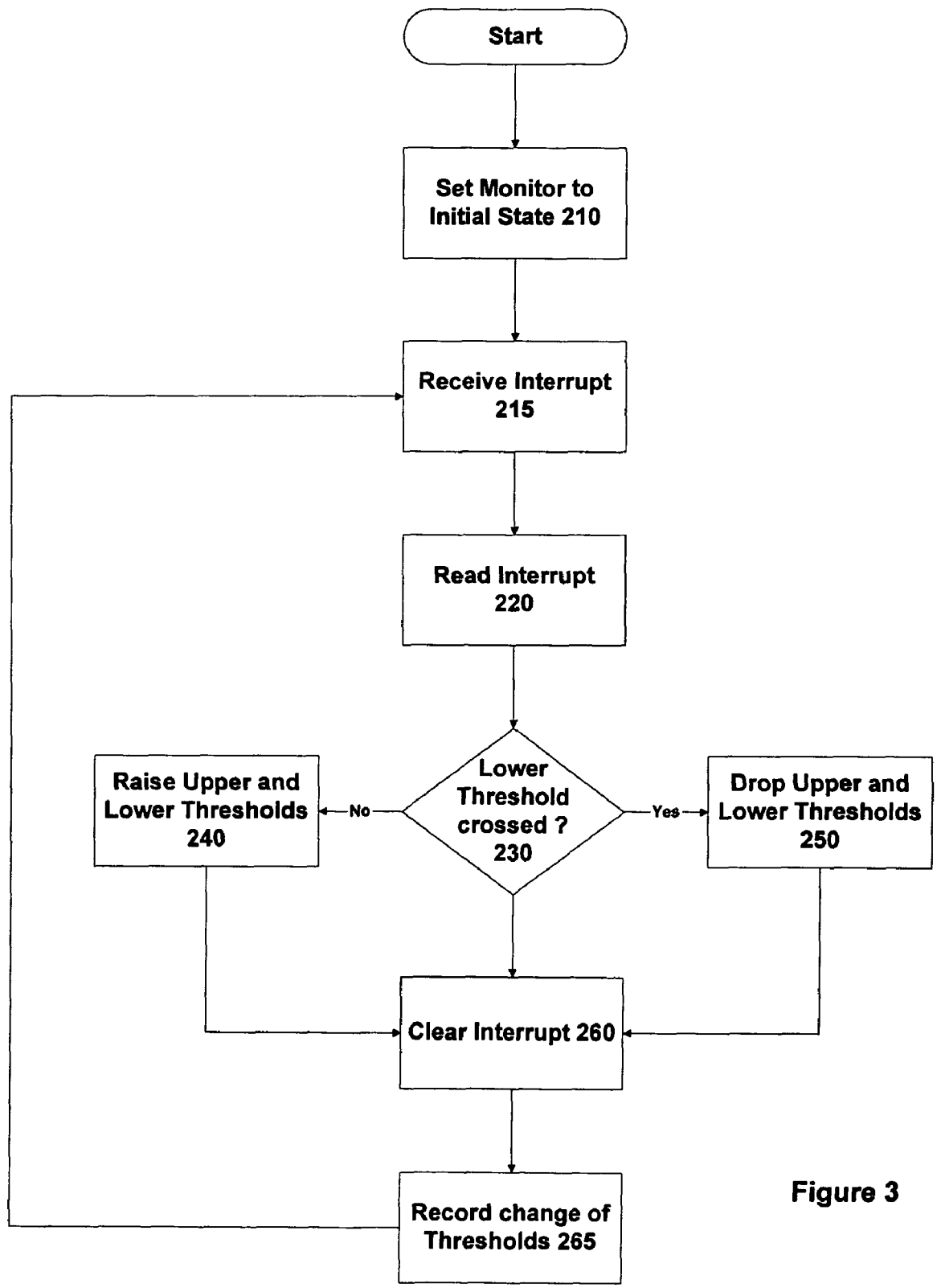
FIG. 3 is a flowchart illustrating processing performed at a control system in the computer system of FIG. 1, in accordance with one embodiment of the invention.

FIG. 3 is a flowchart illustrating the operation of the control system 50 in accordance with one embodiment of the present invention. The method commences with the control system 50 initialising monitor 100 (step 210). This involves writing appropriate values into the high and low registers 121, 122 to define the initial monitoring range. In addition, the control system sets latches 151 and 152 to their zero positions.

Once the monitor 100 has been set by control system 50 to its initial state, the control system 50 waits to receive an interrupt from the monitor 100 (step 215). As discussed in relation to FIG. 2, such an interrupt indicates that latch 151 or latch 152 has been set, due to the parameter being measured reaching the top or bottom respectively of the monitoring range. (This may happen straight away, if the parameter happens to lie outside the initial monitoring range as set at step 210).

In response to the interrupt, the control system 50 reads the interrupt status (step 220). This typically involves determining which of latch 151 and 152 has triggered the interrupt, and may also involve reading the current values of the high register 121 and the low register 122. It will be appreciated that such information might in principle be provided directly with (or as part of) the interrupt at step 215. For example, monitor 100 might be configured so that latch 151 triggers a first form of interrupt, while latch 152 triggers a second form of interrupt. However, the interrupt scheme in most systems is normally kept as simple as possible for reliability reasons. Hence the monitor 100 of the embodiment of FIG. 2 raises just a single form of interrupt, which then causes the control system 50 to access the monitor at step 220 to determine more details concerning the interrupt raised.

A determination is now made as to whether the parameter being measured is above or below the monitoring range. Thus if latch 151 is set to one, then the parameter exceeds the value in high register 121. Alternatively, if latch 152 is set to one, then the parameter is below the value in low register 122 (step 230). The control system 50 now updates the monitoring range to accommodate the change in the parameter being measured. If the lower threshold of the monitoring range has been breached, then the monitoring range is moved downwards (step 250). Conversely, if the upper threshold of the monitoring range has been breached, then the monitoring range is moved upwards (step 240).

Movement of the monitoring range is achieved by altering the values for the upper and lower thresholds of the monitoring range, as stored in high register 121 and low register 122 respectively. Upwards movement of the monitoring range results in higher values being stored into these two registers, while downwards movement of the monitoring range results in lower values being stored into these two registers.

Once the threshold values for the new monitoring range have been written by the control system 50 into high register 121 and low register 122, the control system now clears the interrupt (step 260) by resetting latch 151 or latch 152 as appropriate (depending upon which one triggered). This allows the monitoring system 100 to generate a new interrupt should the parameter being measured reach the limits of the new monitoring range.

In addition, the control system 50 writes information about the interrupt event to storage 60, such as to a log file (step 265). This information typically includes the time of the interrupt plus the new and/or updated values of the thresholds. The stored information therefore provides a record of the time history of the monitoring range.

Processing now returns to step 215, whereby the control system waits for any further interrupt. (Strictly speaking, a further interrupt might be received at any time after the previous interrupt has been cleared, at step 260).

Figure 4:
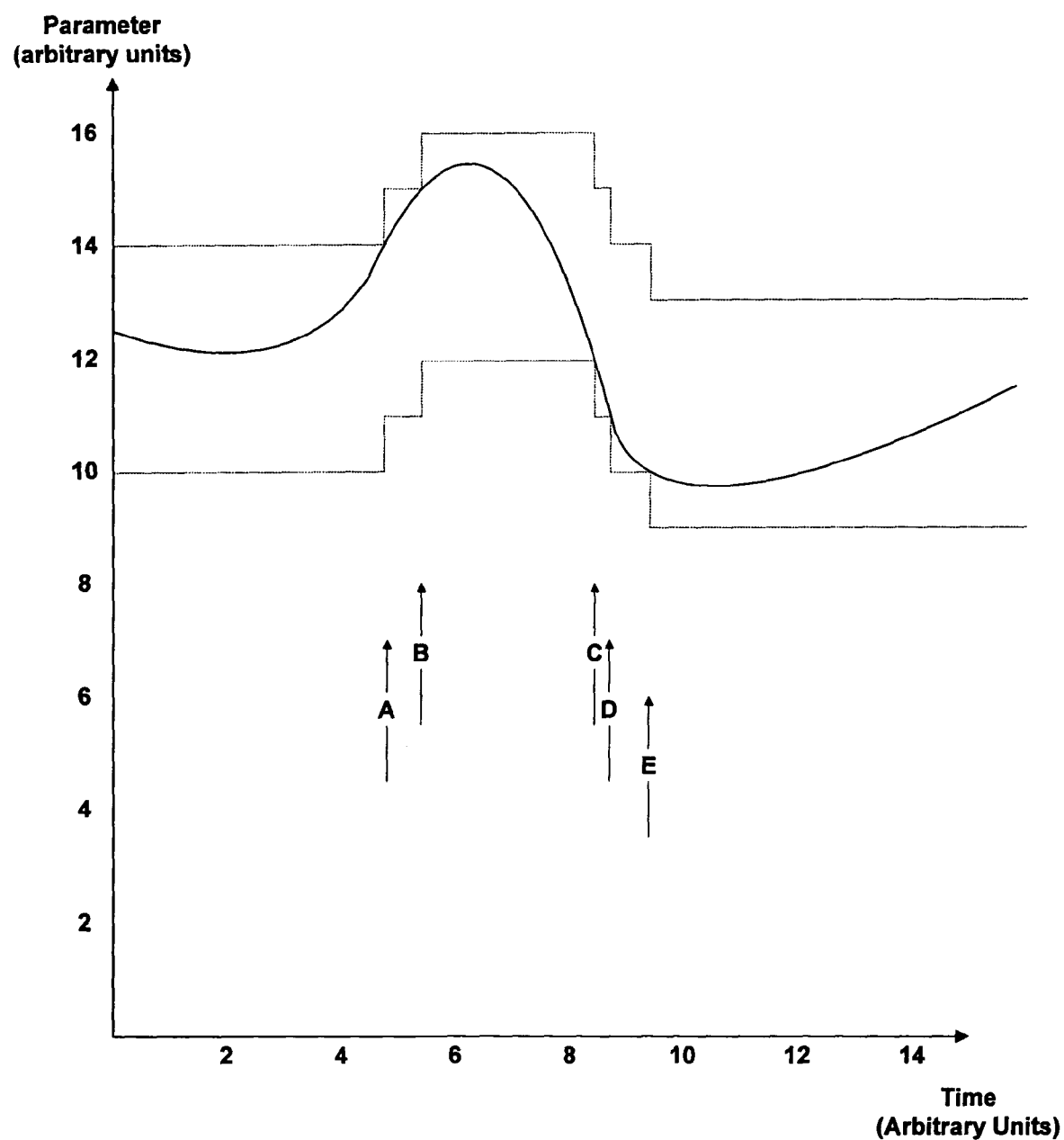
FIG. 4 is a graph illustrating the behaviour of the monitoring range in accordance with one embodiment of the invention, generally corresponding to the flowchart of FIG. 3.

FIG. 4 is a graph illustrating one example of the operation of an embodiment of the invention that generally conforms to the flowchart of FIG. 3. In FIG. 4, the curved line represents the behaviour over time of some physical parameter to be monitored. The time history of the monitoring range is then depicted by the two dashed lines that represent the lower and upper thresholds of the monitoring range. In particular, the top dashed line represents the value stored in the high register 121, while the bottom dashed line represents the value stored in the low register 122.

In the embodiment shown in FIG. 4, the monitoring range is set to a width of 4 (four) units, which is therefore the difference between upper and lower thresholds as stored in high and low registers 121, 122. If the parameter under measurement exceeds the top of the monitoring range, then the monitoring range is raised by one unit (corresponding to step 240 in FIG. 3). Conversely, if the parameter under measurement exceeds (i.e. falls below) the bottom of the monitoring range, then the monitoring range is dropped by one unit (corresponding to step 250 in FIG. 3).

FIG. 4 illustrates 5 events, labelled A, B, C, D and E. Each event indicates an interrupt generated when the physical parameter reaches the edge of the monitoring range, thereby causing the monitoring range to be adjusted. Table 1 below provides information about these events, such as might typically be recorded in a log file on storage 60. The information recorded in Table 1 allows the time history of the monitoring range shown in FIG. 4 to be recreated.

TABLE 1

| Event | Time | Low | High |
|-------|------|-----|------|
| Begin | 0.0 | 10 | 14 |
| A | 4.8 | 11 | 15 |
| B | 5.4 | 12 | 16 |
| C | 8.4 | 11 | 15 |
| D | 8.7 | 10 | 14 |
| E | 9.4 | 9 | 13 |

(Note that column 1 of Table 1 is primarily included to link to FIG. 4, and would not normally be stored in an actual log file. In addition, column 4 could also be dropped as redundant, since the monitoring range in the embodiment of FIG. 4 has a constant size. Consequently, the setting of the high register is known to be always four above the setting of the low register).

Looking at the behaviour of the parameter being measured in FIG. 4, this initially starts with a gentle decline. However, this decline does not trigger any interrupt, since the parameter remains inside the monitoring range. The parameter now starts a relatively steep incline, which takes it to the top limit of the monitoring range. This is reached at event A, whereupon the monitoring range is adjusted upwards. As the parameter continues to rise, it again reaches the top of the (adjusted) monitoring range, as indicated by event B, whereupon the monitoring range is further adjusted upwards.

The parameter now peaks and starts to fall steeply. The parameter reaches the lower limit of the monitoring range at event C, causing the monitoring range to be adjusted back downwards again. The parameter continues to fall, causing two further downwards adjustments of the monitoring range at events D and E. Thereafter the parameter levels out, and starts a gentle rise again. This rise is contained within the monitoring range, and so no further interrupts are generated during the illustrated time period.

It will be seen from FIG. 4 that the time history of the monitoring range, as determined by the values stored in low register 122 and high register 121, approximately tracks the parameter being measured. Although the tracking is not exact, it nevertheless allows the variations of the parameter to be reconstructed to a certain degree of accuracy. Moreover, the tracking provides a set of limits that are known to contain the actual value of the parameter. This information can be especially useful for diagnostic purposes, namely knowing that the parameter being monitored did not exceed a certain threshold, or did not fall below a certain threshold.

Of course, if the variations in the parameter of FIG. 4 need to be tracked more accurately, then one way of doing this is to define a smaller monitoring range. For example, rather than having a monitoring range of 4 units, the monitoring range might be say 3 units, or perhaps 2.5 units. This would then allow the time history of the tracking registers 121, 122 to follow the variations in the parameter more closely, albeit at the expense of the control system receiving more interrupts as the parameter goes outside the monitoring range more frequently. The size of the threshold adjustment could also be reduced to improve tracking accuracy if so desired, say from 1 unit in FIG. 4 to 0.5 units (again at the expense of more interrupts).

Accordingly, there is a trade-off between accuracy of the parameter tracking (as determined by the size of the monitoring range) and the overhead on the control system. It will be appreciated that this trade-off can be configured as appropriate on a parameter by parameter basis in any particular embodiment. Factors that influence the appropriate setting include the desired granularity of measurement (reflecting diagnostic requirements), as well as the time response characteristics of the system. Regarding the latter aspect, a parameter which tends to vary comparatively slowly can be tracked by a relatively narrow measuring range and small adjustments without generating an undue number of interrupts to the control system. It will be appreciated that the time response characteristics of a particular parameter can usually be estimated from an understanding of the physical properties of the system concerned. For example, the rate of temperature fluctuation is generally constrained by the thermal capacity of the relevant components, while the rate of voltage fluctuation may be constrained by various circuit elements.

The parameter tracking approach described herein can be compared to a conventional polling approach. For example, using the curve in FIG. 4, one regular polling strategy might produce the data set: (0, 12.5), (4, 12.9), (8, 13.2), (12, 9.9), (16, 11.6), where the first value in each pair is time, and the second value is parameter reading. Such a polling data set produces a rather poor record of parameter behaviour, and largely misses out the peak between times 4 and 8. Of course, increasing the sampling frequency will ensure that high frequency movement of the parameter is properly tracked (in accordance with the Nyquist theorem). However, such an increase in sampling (polling) increases overheads. This is particularly wasteful for parameters that mainly undergo slow and steady drift with only occasional high frequency peaks or troughs.

Although FIGS. 3 and 4 illustrate one particular approach for tracking the parameter being measured, a wide variety of other implementations are possible. For example, in the embodiment of FIGS. 3 and 4, the monitoring range has a constant size (four units), and so the upper and lower register values move in synchronisation with one another. However, this is not necessarily the case.

In one embodiment, if a particular threshold is exceeded, then only this threshold is moved. Thus if the parameter being monitored exceeds the high threshold, then the high threshold is moved up, while the low threshold is kept constant. Conversely, if the parameter exceeds (falls beneath) the low threshold, then the low threshold is moved down, while the high threshold is kept constant. This results in a broadening of the monitoring range in order to accommodate the movement of the parameter being monitored.

To compensate for such broadening, a timer may be included. This timer may be located in the monitor 100, in the control system 50, or in any other appropriate device. The timer is set at each broadening of the monitoring range, and when the timer expires, an attempt is made to reduce the monitoring range.

Figure 5:
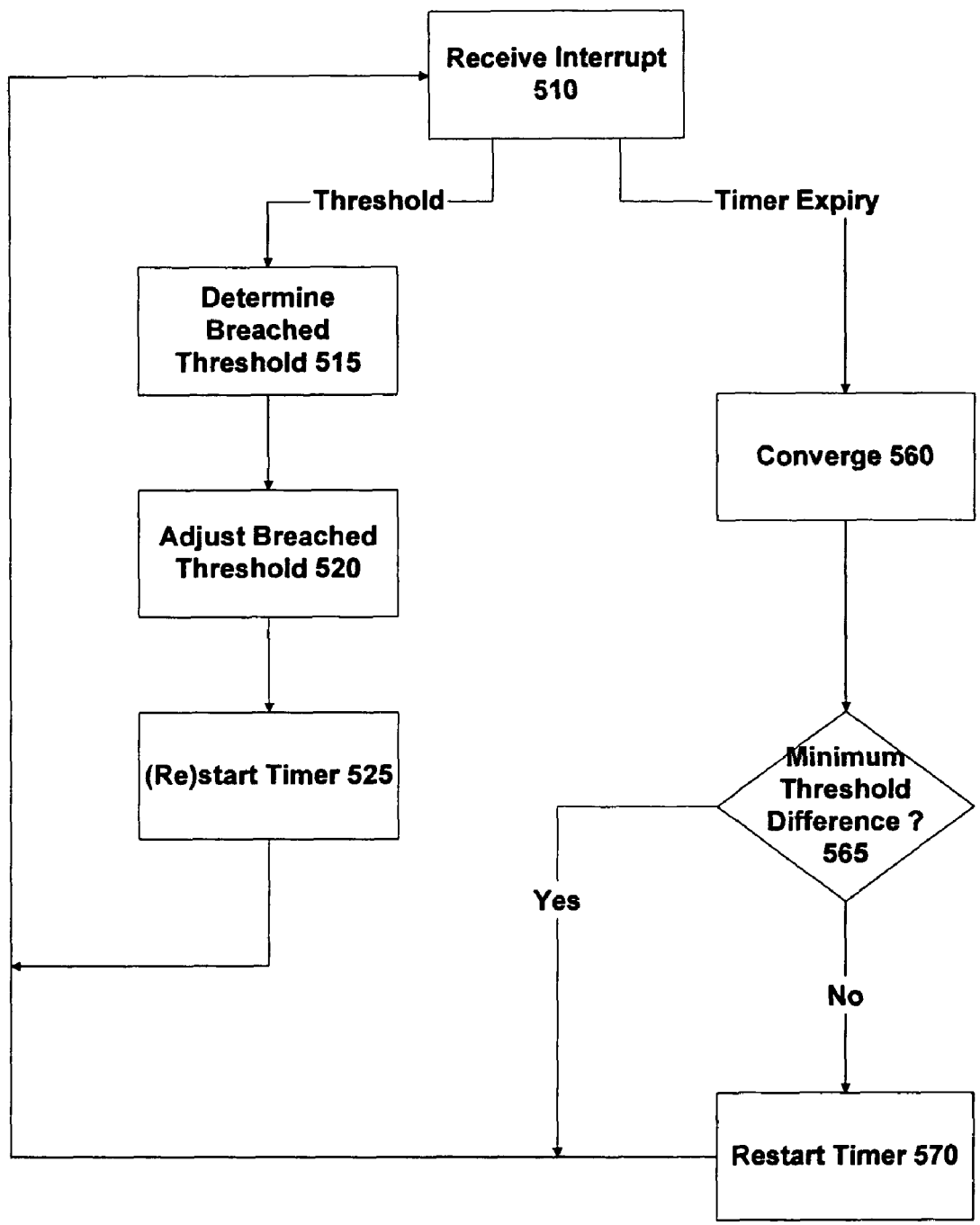
FIG. 5 is a flowchart illustrating processing performed at a control system in the computer system of FIG. 1, in accordance with another embodiment of the invention.

The flowchart of FIG. 5 illustrates the operation of such an embodiment. Note that this flowchart only includes those operations relevant to understanding the behaviour of the monitoring range itself, and so omits certain steps (such as clearing the interrupts) that are largely the same as depicted in FIG. 3. The flowchart of FIG. 5 commences with the control system 50 receiving an interrupt (step 510). This interrupt may be due either to expiry of the timer, or to the parameter being measured lying outside of the monitoring range. Since the timer is not set initially, we start by assuming that the latter possibility has occurred. Accordingly, we branch to step 515, where the threshold that has been breached is identified, typically by looking at which of latches 151 or 152 has been set to one. The monitoring range is now broadened by moving the threshold that has been exceeded a predetermined amount away from the other threshold (by dropping the lower threshold or raising the upper threshold as appropriate) (step 520). The timer is now started (or restarted if it was already in operation) (step 525), and processing returns back up to step 510 where an interrupt is once more awaited.

If we assume that the next interrupt that we receive is from the timer, then we now follow the flowchart down to step 560. In this branch of processing, the control system contracts the monitoring range, thereby enabling the value of the parameter 199 to be tracked more closely. Accordingly, in step 560 the monitoring range is contracted, whereby the upper threshold in high register 121 is reduced and the lower threshold in low register 122 is increased. A test is now performed (step 565) to see if the monitoring range is at some predefined minimum value. The timer is only restarted (step 570) if the monitoring range has not reached this minimum value. The test of step 565 prevents the control system from trying to narrow the monitoring range too much (which would result in an undesirably large number of interrupts, as the monitor 100 tried to track the movement of the parameter at an unnecessarily fine level).

Figure 6:
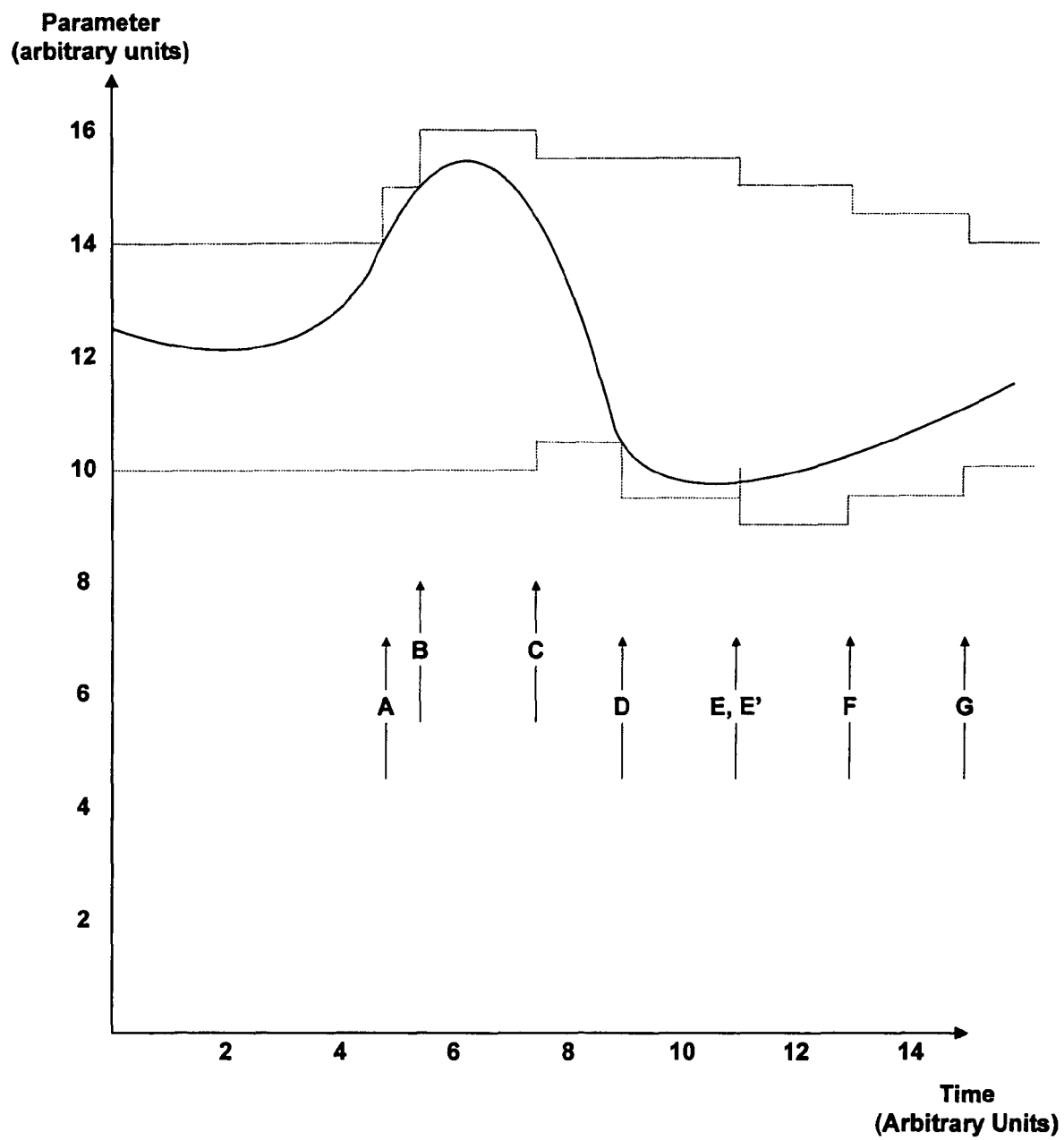
FIG. 6 is a graph illustrating the behaviour of the monitoring range in accordance with another embodiment of the invention, generally corresponding to the flowchart of FIG. 5.

FIG. 6 presents a graph analogous to that of FIG. 4, only this time using the parameter adjustment strategy of FIG. 5 (rather than that of FIG. 3). It is assumed in FIG. 6 that the timer period is 2 units, and the convergence amount is 0.5 units. Eight particular events in FIG. 6 are indicated by arrows A, B, C, D, E, F, F, and G. Each of these events corresponds to an interrupt received by the control system, and is detailed in Table 2 below. Note that the second column of Table 2 indicates whether the event was a range interrupt (leading to step 515 in FIG. 5) or a timer interrupt (leading to step 550 in FIG. 5).

TABLE 2

| Event | Type  | Time | Low  | High |
|-------|-------|------|------|------|
| Begin |       | 0.0  | 10   | 14   |
| A     | Range | 4.8  | 10   | 15   |
| B     | Range | 5.4  | 10   | 16   |
| C     | Timer | 7.4  | 10.5 | 15.5 |
| D     | Range | 8.9  | 9.5  | 15.5 |
| E     | Timer | 10.9 | 10   | 15   |
| E'    | Range | 10.9 | 9    | 15   |
| F     | Timer | 12.9 | 9.5  | 14.5 |
| G     | Timer | 14.9 | 10   | 14   |

As shown in FIG. 6, the first two events, namely A and B, occur when the steep incline reaches the upper threshold (as in FIG. 4). In both cases, the upper threshold in FIG. 6 is raised by a single unit, but the lower threshold remains unchanged (in contrast to FIG. 4).

The next event at arrow C occurs when the timer expires, and the monitoring range is contracted. The sharp decline of the curve then leads it to breach the lower threshold at event D, causing the lower threshold to be reduced (but the upper threshold to remain constant). The timer now expires at event E, at which point a convergence is performed. However, this takes the lower limit above the curve, so the lower threshold is immediately dropped back again at event E'. The timer next expires, firstly at event F and then at event G, and convergence is again performed. Note that after event G, the monitoring range is back to a width of 4 units (i.e. its initial value), which might reasonably correspond to the predefined minimum width (see step 565 of FIG. 5). If this is indeed the case, then no further convergence would be performed.

The dual tracking lines of FIG. 6 therefore not only follow the broad trend of the parameter being tracked (in statistical terms, they provide a location estimate), but also the lines reflect information about the level of noise (variance) to which the parameter is subject. Thus the higher the noise level being experienced by the parameter, the greater the separation between the two tracking lines becomes. Conversely, if a period of high noise ends, then the two tracking lines will converge back towards one another. This indication of the time history of noise level can provide a useful diagnostic.

The skilled person will be aware of many different possible algorithms that could be employed to follow a given parameter, representing a wide range of variations on the flowcharts of FIGS. 3 and 5. For example, rather than having a separate test at step 565 to determine if the system is at the minimum monitoring range, this could be integrated into the convergence step at step 560 (so that converging when the range is already at its minimum would not produce any further convergence).

Figure 5A:
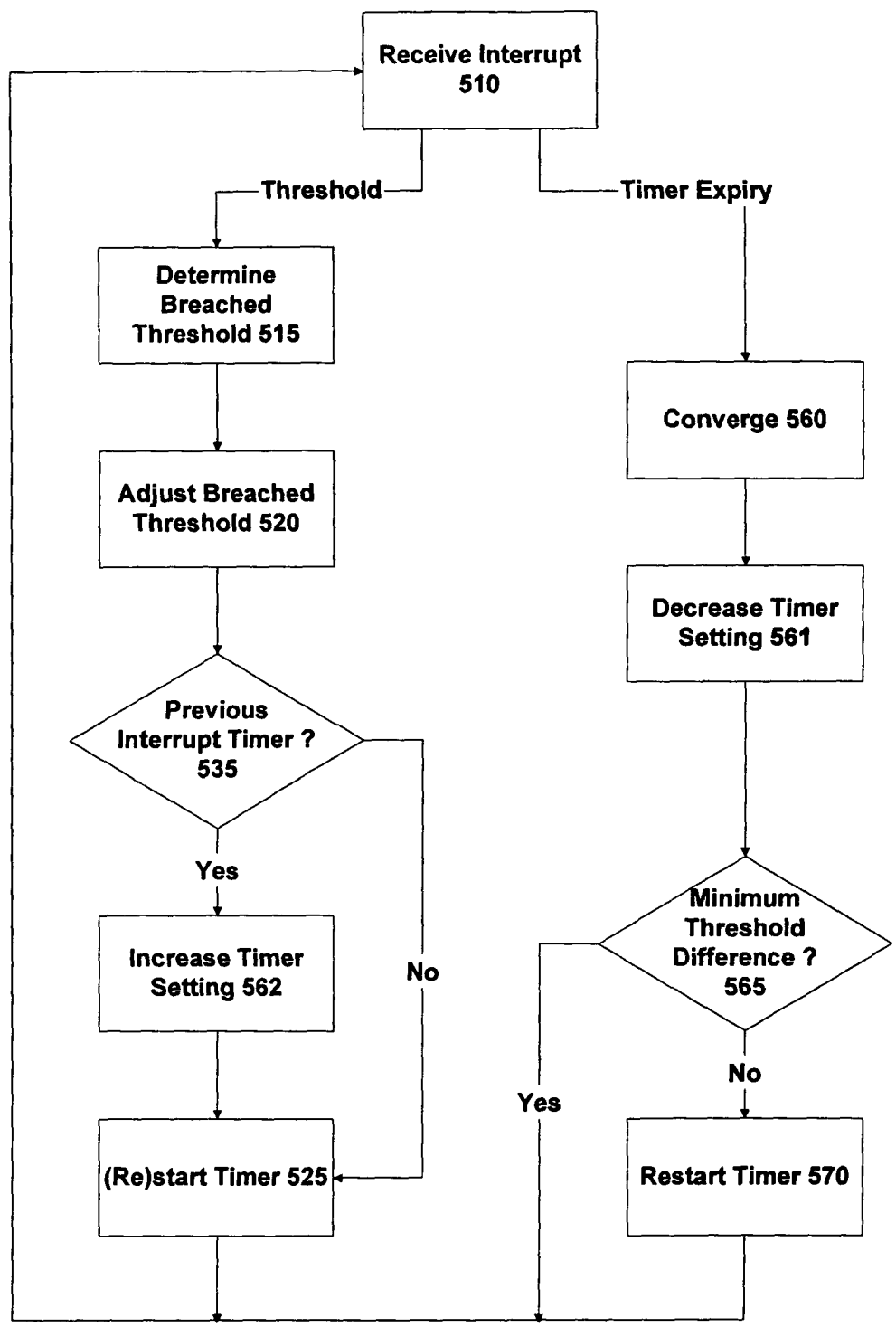
FIG. 5A is a flowchart representing a possible variation on the processing of FIG. 5, in accordance with one embodiment of the invention.

Another possibility is to recognise that a signal may become noisy for a period of time, so that repeated attempts to converge the monitoring range fail. In this situation, it may be appropriate to have a variable timer setting, as illustrated in the flowchart of FIG. 5A. Note that this processing represents a variation on the processing of FIG. 5, and so only the differences will be described.

As illustrated in FIG. 5A, if the monitoring range is being compressed, then the timer setting is decreased (step 561). Alternatively, if the system has a timer interrupt followed by a range interrupt, the timer setting is increased (step 562). Increasing the timer setting tries to avoid the system wasting unnecessary resources on repeated convergence attempts when the signal is noisy, while decreasing the timer setting attempts a more aggressive convergence if the signal becomes more quiescent. Note that decreasing the timer setting at step 561 and increasing the timer setting at step 562 are typically subject to a minimum/maximum timer setting respectively.

Another possible variation is to perform the convergence of the monitoring range separately for each threshold. In other words, at step 560 a first test is made to see if the upper threshold can be reduced, and a (separate) second test is made to see if the lower threshold can be increased. If this approach is taken, and a variable timer setting is employed (as in FIG. 5A), there would typically be a separate timer associated with each threshold. These timers can then be increased or decreased in accordance with whether or not the corresponding threshold has been moved. This would then entail splitting the right-hand branch of FIG. 5A into two separate paths, the first associated with processing an interrupt from expiry of the timer associated with the lower threshold (which would result in an attempt to raise this lower threshold), and the second associated with processing an interrupt from expiry of the timer associated with the upper threshold (which would result in an attempt to lower this upper threshold). The restart timer step of 525 would then relate to the timer for the threshold just reached, while the restart timer step of 570 would relate to the timer that had just expired.

Although the embodiments so far described expand and contract the monitoring range by a fixed amount each time, such changes could be made adaptive to the parameter signal. For example, if the signal breached the upper threshold twice in quick succession, the upper threshold might be raised by a greater amount on the second occasion than on the first occasion. The skilled person will be aware of a wide range of other tracking strategies that might be employed.

Figure 7:
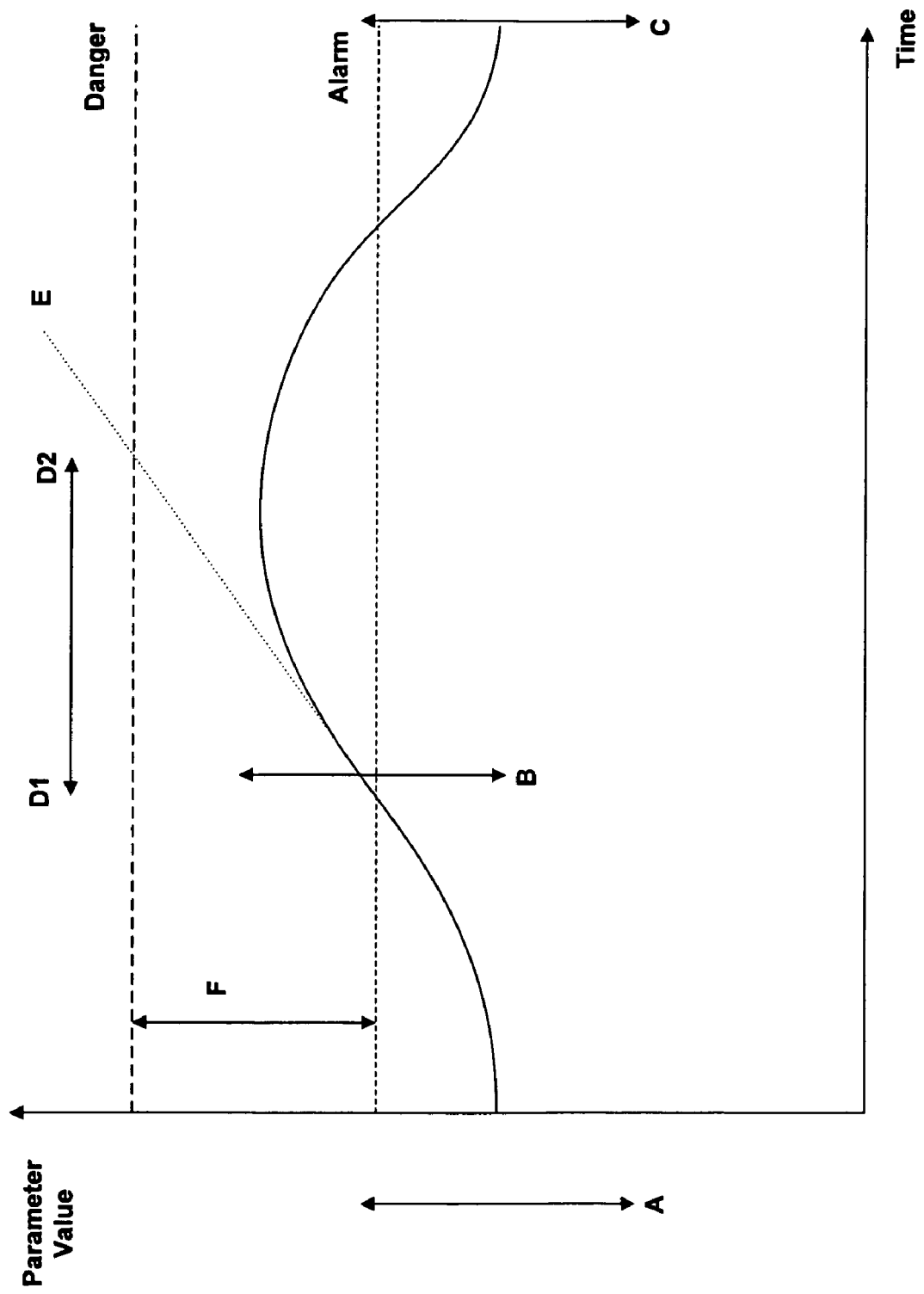
FIG. 7 is a graph illustrating parameter tracking in accordance with one embodiment of the invention in conjunction with an alarm setting.

FIG. 7 illustrates the use of the parameter tracking approach described above integrated into an alarm context. The assumed behaviour of the parameter of interest is shown by the solid curve. If this parameter reaches the level indicated by the dashed line marked Danger, then there is some risk to the system. For example, this might represent a voltage that is so high that some component might be damaged, or that certain components might no longer operate correctly. Accordingly, if the parameter reaches this Danger level then some preventative action must be taken, such as shutting down the system or device concerned. Although this is generally disruptive to the user, it is nevertheless better than allowing the system to suffer potentially more serious damage.

With a known polling approach, an Alarm level is set, as indicated by the (short) dashed line in FIG. 7. If a polled value is obtained that is over the Alarm level, then this triggers the preventative action in order to ensure that the system does not go over the Danger level. The Alarm level is a predetermined amount F below the Danger level. The value of F is determined as the maximum that the parameter can rise in the polling interval (indicated in FIG. 7 by the line D1-D2). More particularly, it is determined, theoretically from an understanding of the physical characteristics of the system and/or experimentally, that the parameter in question can rise at a maximum rate as indicated by dotted line E in FIG. 7. Accordingly, the Alarm level is set an amount F below the Danger level, where F corresponds to the rise in line E over time interval D1-D2 (i.e. F/D2−D1 corresponds to the gradient of line E). It is therefore known that the Danger level cannot be exceeded without at least one parameter reading (i.e. polling) occurring when the parameter is between the Alarm level and the Danger level, thereby allowing appropriate preventative action to be taken.

Unfortunately however such a strategy results in preventative action being taken even when the parameter will not in fact exceed the Danger level. Thus on some (perhaps most) occasions when the Alarm level is exceeded, the parameter may ultimately return to a safe level, as opposed to continuing past the Danger level. This indeed is the case for the curve shown in FIG. 7. Consequently, the inconvenience of the preventative action may be imposed on users more often than is necessary to safeguard the integrity of the system.

Such a situation can be addressed by the parameter tracking approach described herein, which directly monitors the upper and lower thresholds of a parameter. Thus in FIG. 7, it is assumed that arrow A represents an initial monitoring range. This initial monitoring range is subsequently adjusted to the range of arrow B as the parameter under measurement climbs. The parameter is now above the alarm level, but there is still no particular need to trigger an Alarm. This is because it is known that a further interrupt will be generated before the Danger level is reached.

If the monitoring range indicated by arrow B is subsequently exceeded, then the system may now choose to activate the alarm. Alternatively, the monitoring range may be shifted further upwards, providing of course that the upper threshold does not exceed the Danger level. It will be appreciated that such an approach helps to ensure that preventative action is only taken when strictly necessary.

The parameter tracking approach described herein may also be integrated into an alarm context in other configurations apart from that shown in FIG. 7. For example, it may be that a component can possibly tolerate a high temperature for a limited period of time, but may be damaged due to prolonged exposure to such a high temperature. This can be tracked by setting a monitoring range including the high temperature, and by using a timer such as described above to generate an alarm if the parameter remains within the high temperature monitoring range for more than a certain period of time.

Returning to FIG. 3, it will be appreciated that after an interrupt is triggered (immediately prior to step 215), the system is no longer sensitive to the value of the parameter being measured until the interrupt is cleared (reset) at step 260. The period between step 215 and 260 can therefore be regarded as monitor dead-time. Indeed, even after step 260, if the parameter is still outside the new (adjusted) threshold, then a further interrupt will be immediately generated. In this latter situation, it is still not possible to set a bound on the parameter being measured (although it is known that its value lies outside the new monitoring range).

System 10 is designed so that the dead-time is as short as possible. This is helped by using an interrupt (rather than some other slower form of message) to notify the control system 50 that the parameter has breached the monitoring range. This minimises the amount of time that the system does not have known bounds for the parameter being measured.

For some parameters, there may be physical reasons why the interrupt processing (i.e. the dead-time) is short compared to the timescale of parameter variation. For example, if the parameter being measured is temperature, then abrupt changes in temperature are prevented by the thermal capacity of the system. In addition, it is possible to model the maximum temperature rise (or fall) that could be experienced based on the thermal properties of the various system components. For example, if a threshold T is reached for such a temperature parameter, then after a dead-time D, it is known that the parameter must lie within f(T,D) of T, where f( ) is a function that depends on the (known) thermal behaviour of the system, and can be determined by modelling and/or measurement. This has two benefits. Firstly, the value of the parameter being tracked falls within known bounds, even during the dead-time. Secondly, the adjustment to the monitoring range following an interrupt (step 240 or step 250) can be appropriately gauged so that the new monitoring range should reliably encompass the current parameter value.

Other parameters being measured, such as voltage, may be subject to more rapid and unpredictable variations. In some cases, it may be possible to (re)design the system to avoid such rapid variations—for example, by adding some circuit filter element to restrain voltage fluctuations. However, in other circumstances, such filtering may not be feasible (e.g. if the monitors are added to an existing system). In this case, the value of the parameter being measured during the dead-time must be regarded as unknown.

Figure 8:
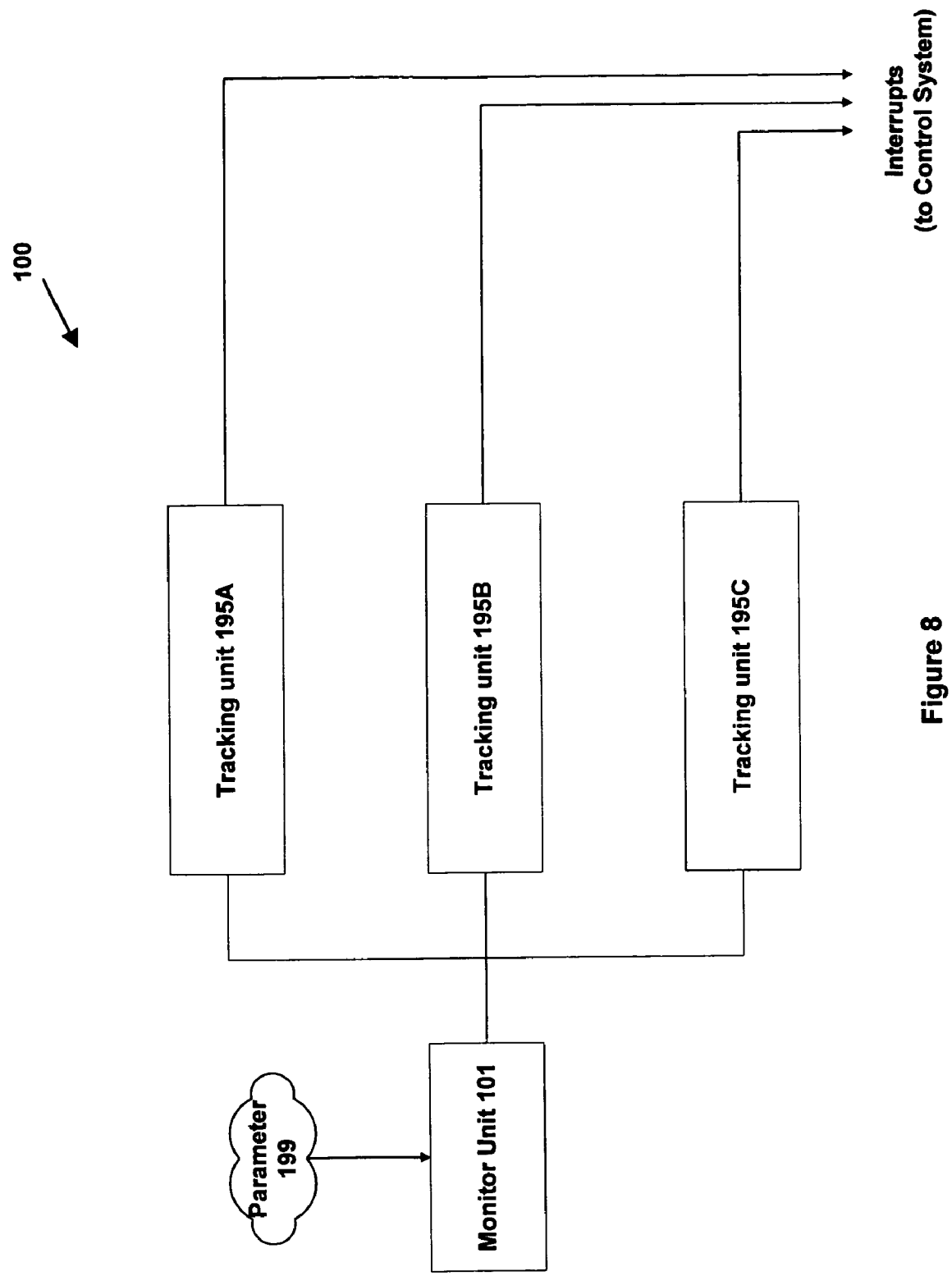
FIG. 8 illustrates a monitor from the computer system of FIG. 1 in accordance with one embodiment of the invention.

FIG. 8 illustrates one approach to address uncertain parameter values during monitor dead-time. In this embodiment, the tracking unit 195 from FIG. 2 is replicated multiple times (N.B. for simplicity, the internal details of the tracking units are omitted from FIG. 8). Thus each of the three tracking units 195 in FIG. 8 sets it own monitoring range in accordance with control inputs from the control system 50, and signals an interrupt to the control system when the parameter lies outside its own monitoring range.

The multiple tracking units 195A, 195B, and 195C can be arranged to have hierarchical or cascading monitoring ranges. For example, unit 195A might be configured with a monitoring range 8-12, unit 195B could have a monitoring range of 6-14, and unit 195C could have a monitoring range of 3-18. Therefore, even if the parameter being measured goes outside the range of unit 195A, which therefore experiences deadtime while its monitoring range is being adjusted, it will still typically be contained within the bounds of unit 195B. Alternatively, if the parameter is changing faster, then unit 195B may interrupt very shortly after unit 195A, during the deadtime of unit 195A. In this case, the parameter is still known to lie within the monitoring range of unit 195C. Note that determining whether or not unit 195B has tripped as well as unit 195A gives information about the trajectory (gradient) of the parameter. This is useful for modelling the behaviour of the parameter (and potentially also for deciding how to set the new monitoring range(s)).

It will be appreciated that although FIG. 8 illustrates three tracking units, other embodiments may employ only two tracking units, or possibly more than three units. Furthermore, a range of algorithms as discussed above could be used to control the monitoring ranges of the various tracking units (e.g. fixed or variable widths, timers to contract the monitoring range etc). Different tracking units could use different adjustment policies, providing a suitable overall hierarchical structure was maintained.

One potential modification to the various embodiments so far described is for the monitor 100 to be implemented using only digital electronics. In this case, the output from the monitor unit 101 would typically first be converted into digital format (if not already in such format). D to A converters 126 and 127 would then be omitted, and comparators 141 and 142 would be digital devices. The use of digital elements in this manner would generally increase the response time of monitor 100, but would typically bring other benefits, such as ease of integration into other digital electronics (perhaps all fabricated on a single chip).

Extending this idea, it is also possible to develop a software-based implementation of the parameter tracking described herein. In this case, the comparison between the output from the monitor unit and the monitoring range as specified by the control system may be made in software, rather than by one or more discrete comparators. The use of a software approach provides greater flexibility, albeit at the cost (typically) of a somewhat lower bandwidth for parameter tracking and increased system complexity. For example, the same monitor design might be used in many different locations within a system, with the software control then being adapted to provide the correct parameter tracking algorithm in any given situation.

A further possible variation is for the processing of the control system (such as when determining the new monitoring range) to be performed locally within monitor 100, rather than at some (remote) centralised control system 50. Likewise, there could be local storage of the parameter history (such as detailed in Table 1), for example using an EPROM or similar device (this may be instead of or in addition to centralised storage, such as at unit 60). It will be appreciated that a software implementation generally facilitates such local processing control and/or local data storage.

Although the parameter tracking described herein has generally been presented in the context of a computer server, it is applicable to a very wide range of electronic apparatus. This includes a broad variety of computing systems (mainframe, server, workstation, desktop, laptop, handheld, etc.), as well as a great range of other electronic systems, such as telecommunications apparatus, household electronic devices such as televisions and DVD players, subsystems for transport devices such as cars and aeroplanes, and so on.

The approach can also be used for monitoring installations such as power stations, factories, office buildings, and so on. Note that in such circumstances the limits of the parameter being tracked (i.e. the upper and lower thresholds) may be displayed to a human operator rather than (or as well as) being recorded in a log file. For example, a human operator may have an instrumentation panel that indicates the current monitoring range for temperature in various parts of a building. The operator may then adjust various air conditioning systems in accordance with the observed temperature fluctuations—e.g. by bringing on-line an additional cooling system if the monitoring range (or at least the upper threshold thereof) for a certain temperature is seen to rise. It will be appreciated that this sort of approach could also be taken in other environments with a real-time human operator, such as on an aeroplane, in a car, and so on.

Any software used for the parameter tracking described herein typically comprises program instructions on some fixed, non-volatile storage such as a hard disk or flash memory. These instructions can then be loaded for use into random access memory (RAM) for execution by a system processor, an application specific integrated circuit (ASIC), or by any other such device. Rather than being stored on a hard disk or other fixed device, part or all of the program instructions may also be stored on a removable storage medium, such as an optical (CD ROM, DVD, etc), magnetic (floppy disk, tape, etc), or semiconductor (removable flash memory) device. Alternatively, the program instructions may be downloaded via a transmission signal medium over a network, for example, a local area network (LAN), the Internet, and so on. Data for manipulation by the program instructions may be provided with the program instructions themselves, and/or may be provided from additional source(s).

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A computer-implemented method of monitoring a parameter in a system, comprising:
   defining a monitoring range for the parameter;
   tracking the parameter by determining whenever the parameter exceeds a limit of the monitoring range;
   responding to a determination that the parameter exceeds the limit of the monitoring range by adjusting the monitoring range to try to accommodate the parameter; and
   recording a time history of the monitoring range.

2. The method of claim 1, wherein said recording is performed in response to the determination that the parameter exceeds the limit of the monitoring range.

3. The method of claim 1, wherein said monitoring range is defined by an upper threshold and a lower threshold.

4. The method of claim 3, further comprising storing the upper threshold in a first register and the lower threshold in a second register, wherein said determining whenever the parameter exceeds a limit of the monitoring range comprises comparing the parameter against the upper threshold in the first register and the lower threshold in the second register.

5. The method of claim 4, further comprising performing a digital to analogue conversion of the upper threshold and of the lower threshold, wherein said comparing against the upper threshold is performed by a first analogue comparator, and said comparing against the lower threshold is performed by a second analogue comparator.

6. The method of claim 5, further comprising latching the output of the first analogue comparator in a first latch, latching the output of the second analogue comparator in a second latch, and combining the outputs of the first and second latches using OR logic.

7. The method of claim 1, further comprising raising an interrupt in response to determining that the parameter has reached a limit of the monitoring range.

8. The method of claim 7, wherein in response to the interrupt the adjustment of the monitoring range is performed, and details of the adjustment of the monitoring range are recorded in a time history.

9. The method of claim 8, wherein said tracking is performed by a monitor which transmits said interrupt to a control unit in response to determining that the parameter exceeds a limit of the monitoring range, and wherein the control unit responds to the interrupt by notifying the monitor of the adjusted monitoring range and recording details of the adjustment in local storage.

10. The method of claim 1, wherein said monitoring range has a fixed width.

11. The method of claim 1, wherein said monitoring range has a variable width, and said method further comprises the step of trying to contract the monitoring range.

12. The method of claim 11, further comprising using the variable width of the monitoring range to estimate a noise level for the parameter.

13. The method of claim 1, wherein the adjustment of the monitoring range is performed using an adaptive algorithm.

14. The method of claim 1, further comprising triggering an alarm if said parameter exceeds the limit of said monitoring range corresponding to a predetermined alarm level.

15. The method of claim 1, further comprising defining multiple overlapping monitoring ranges for the parameter, and wherein the parameter is tracked by determining whenever the parameter exceeds a limit of any of said monitoring ranges.

16. The method of claim 1, wherein said parameter corresponds to temperature.

17. The method of claim 1, wherein said parameter corresponds to voltage.

18. Apparatus for tracking a parameter within a defined monitoring range, said apparatus comprising:
   a monitor unit operable to determine whenever the parameter exceeds a limit of said defined monitoring range; a control system linked to the monitor unit and responsive to a determination by the monitor unit that the parameter exceeds the limit of the defined monitoring range to adjust the defined monitoring range to try to accommodate the parameter; and
   a storage facility operable to hold a time history of the defined monitoring range.

19. The apparatus of claim 18, wherein the storage facility is further operable to update the time history of the defined monitoring range in response to the determination by the monitor unit that the parameter exceeds the limit of the defined monitoring range.

20. The apparatus of claim 18, wherein said defined monitoring range is specified by an upper threshold and a lower threshold, and said monitor unit comprises a first register operable to store the upper threshold and a second register operable to store the lower threshold.

21. The apparatus of claim 20, further comprising a first analogue comparator and a second analogue comparator, wherein in operation the first analogue comparator determines whether the parameter exceeds said upper threshold, and the second analogue comparator determines whether the parameter exceeds said lower threshold.

22. The apparatus of claim 21, further comprising a first latch for latching an output of the first analogue comparator and a second latch for latching an output of the second analogue comparator.

23. The apparatus of claim 22, further comprising an OR gate having as a first input an output of the first latch and as a second input an output of the second latch.

24. The apparatus of claim 18, wherein an interrupt is generated in response to determining that the parameter exceeds a limit of the monitoring range.

25. The apparatus of claim 24, wherein said monitor unit is operable to transmit said interrupt to the control system in response to determining that the parameter exceeds a limit of the monitoring range, and wherein the control system is operable to respond to the interrupt by notifying the monitor unit of the adjusted monitoring range and by recording details of the adjustment in local storage.

26. The apparatus of claim 18, wherein said monitoring range has a fixed width.

27. The apparatus of claim 18, wherein said monitoring range has a variable width, wherein the apparatus is responsive to at least one condition to try to contract the monitoring range.

28. The apparatus of claim 27, wherein said apparatus further comprises at least one timer, and said at least one condition comprises expiry of the at least one timer.

29. The apparatus of claim 18, wherein the adjustment of the monitoring range is performed using an adaptive algorithm.

30. The apparatus of claim 18, further comprising an alarm which is triggered if said parameter exceeds the limit of said monitoring range corresponding to a predetermined alarm level.

31. The apparatus of claim 18, wherein said parameter corresponds to temperature.

32. The apparatus of claim 18, wherein said parameter corresponds to voltage.

33. The apparatus of claim 18, wherein there are multiple monitor units attached to a single control system, and wherein the time history for each of said multiple monitor units is recorded in a storage facility.

34. The apparatus of claim 18, wherein multiple overlapping monitoring ranges are defined for the parameter, and wherein the apparatus determines whenever the parameter exceeds a limit of any of said monitoring ranges.

35. Apparatus for tracking a parameter, said apparatus comprising:
two or more monitor units operable to determine whenever the parameter exceeds a limit of a defined monitoring range, wherein each of the two or more monitor units has a respective defined monitoring range, and wherein the monitoring ranges of the different monitor units are defined to have a hierarchical configuration; and
a control system linked to the monitor units and responsive to a determination by at least one of said two or more monitor units that the parameter exceeds the limit of the defined monitoring range for that monitor unit to adjust the defined monitoring range to try to accommodate the parameter; and
a storage facility operable to hold a time history of the defined monitoring range.

36. Apparatus for monitoring a parameter in a system comprising:
means for defining a monitoring range for the parameter;
means for tracking the parameter by determining whenever the parameter exceeds a limit of the monitoring range;
means for responding to a determination that the parameter exceeds the limit of the monitoring range by adjusting the monitoring range to try to accommodate the parameter; and
means for recording a time history of the monitoring range.

37. A computer program product comprising program code in a non-transitory storage medium, said program code when executed by a machine causing the machine to:
define a monitoring range for the parameter;
track the parameter by determining whenever the parameter exceeds a limit of the monitoring range;
respond to a determination that the parameter exceeds the limit of the monitoring range by adjusting the monitoring range to try to accommodate the parameter; and
record details of the adjustment of the monitoring range in a time history.

38. The computer program product of claim 37, wherein said program code further causes the machine to raise an interrupt in response to determining that the parameter exceeds a limit of the monitoring range.

39. The computer program product of claim 38, wherein in response to the interrupt the monitoring range is adjusted, and details of the adjustment of the monitoring range are recorded in the time history.

40. The computer program product of claim 37, wherein said monitoring range has a fixed width.

41. The computer program product of claim 37, wherein said monitoring range has a variable width, and said program code further causes the machine to try to contract the monitoring range.

42. The computer program product of claim 37, wherein the adjustment of the monitoring range is performed using an adaptive algorithm.

43. The computer program product of claim 37, wherein the program code further causes the machine to trigger an alarm if said parameter exceeds the limit of said monitoring range corresponding to a predetermined alarm level.

44. The computer program product of claim 37, wherein said parameter corresponds to temperature.

45. The computer program product of claim 37, wherein said parameter corresponds to voltage.

* * * * *